United States Patent
Stevens

(10) Patent No.: US 11,304,377 B2
(45) Date of Patent: Apr. 19, 2022

(54) PLANT HOLDING UNIT

(71) Applicant: David Stevens, San Clemente, CA (US)

(72) Inventor: David Stevens, San Clemente, CA (US)

(*) Notice: Subject to any disclaimer, the term of this patent is extended or adjusted under 35 U.S.C. 154(b) by 0 days.

(21) Appl. No.: 16/628,946

(22) PCT Filed: Dec. 12, 2019

(86) PCT No.: PCT/US2019/065942
§ 371 (c)(1),
(2) Date: Jan. 6, 2020

(87) PCT Pub. No.: WO2020/149966
PCT Pub. Date: Jul. 23, 2020

(65) Prior Publication Data
US 2021/0337740 A1 Nov. 4, 2021

Related U.S. Application Data

(60) Provisional application No. 62/793,894, filed on Jan. 18, 2019.

(51) Int. Cl.
*A01G 9/02* (2018.01)
(52) U.S. Cl.
CPC ............. *A01G 9/023* (2013.01); *A01G 9/025* (2013.01)
(58) Field of Classification Search
CPC . A01G 9/023; A01G 9/00; A01G 9/02; A01G 9/022; A01G 9/024; A01G 9/025
See application file for complete search history.

(56) References Cited

U.S. PATENT DOCUMENTS

| | | | | |
|---|---|---|---|---|
| 4,123,873 A | * | 11/1978 | Canova | A01G 9/023 47/31.1 |
| 4,216,623 A | | 8/1980 | Silver | |
| 4,622,777 A | * | 11/1986 | Greene, Jr. | A01G 9/022 47/67 |
| 10,660,283 B2 | * | 5/2020 | Tidona | A01G 9/023 |
| 2005/0246955 A1 | | 11/2005 | Bissionnette et al. | |
| 2006/0156624 A1 | * | 7/2006 | Roy | A01G 9/025 47/62 R |
| 2010/0146855 A1 | * | 6/2010 | Ma | A01G 9/025 47/82 |
| 2011/0113685 A1 | | 5/2011 | Chang | |
| 2015/0313104 A1 | | 11/2015 | Cottrell | |
| 2018/0092314 A1 | | 4/2018 | McGuinness et al. | |

FOREIGN PATENT DOCUMENTS

WO  WO2020076729  *  4/2020  ........... A01G 131/02

* cited by examiner

*Primary Examiner* — Kristen C Hayes
(74) *Attorney, Agent, or Firm* — My Patent Guys; Christopher Filling; Johan Eide

(57) ABSTRACT

The present invention includes a plant holding unit for supporting a plant on a generally vertical member. A plant container held by plant holding unit is held below a plane approximately normal to the outer surface of the generally vertical member. The plant holding unit is configured to support a plant container on a generally vertical member. The plant holding unit includes an opening having an axis and a perimeter edge, wherein the axis is approximately perpendicular to the first plane defining a general direction of plant growth. The plant holding unit also includes a barrier extending generally vertically from and attached to the perimeter edge, wherein the barrier forms a water retaining area.

8 Claims, 6 Drawing Sheets

US 11,304,377 B2

PLANT HOLDING UNIT

BACKGROUND OF THE INVENTION

1. Field of the Invention

The present invention generally relates to growing systems, more particularly to a plant holding unit for supporting one or more plants in a general vertical arrangement.

2. Description of Related Art

Commonly available aeroponic, hydroponic, ultraponic, aquaponic systems, or similar systems allow for plants to grow without the use of soil as a rooting medium. Traditionally, plants are grown in a natural orientation, where the base of a plant is parallel to the horizontal orientation of the ground, and the plant is commonly embedded in a soil medium, a pot, or a planting garden bed. Many commonly available plant growing systems mimic this traditional orientation and hold a plant or a plant holding container such that the base of the plant is roughly parallel to the horizontal orientation of the ground where the plant growing system rests upon. To save space, some available plant growing systems incorporate a generally vertical member, where vertical space is utilized by placing plants on vertical shelfs. In this example, the plant base is still parallel to the horizontal orientation of the ground.

Additionally, many traditional aeroponic, hydroponic, ultraponic, aquaponic systems, or similar systems are used in urban environments or indoors where reducing liquid leaks is important. Liquid leaks often lead to the loss of water and nutrients. Liquid leaks may also lead to unsightliness or biomass accumulation such as mold, mildew, and fungi.

Liquid leaks tend to be especially difficult to prevent in generally vertical aeroponic, hydroponic, ultraponic, aquaponic systems, or similar systems where the plant base is not parallel to the horizontal orientation of the ground. Maximizing space, and aesthetics, are among key factors desired by the user in these generally vertical aeroponic, hydroponic, ultraponic, aquaponic or similar systems. Many traditional systems lack the ability to provide these desired factors to the consumer without a propensity for leaks, and an improved design for growing plants in generally vertical aeroponic, hydroponic, ultraponic, aquaponic systems, or similar systems with plant holding units comprising an opening having an axis and a perimeter rim, the opening aligned along a first plane angled below a second plane approximately normal to an outer surface of the generally vertical member, wherein the axis is approximately perpendicular to the first plane defining a general direction of plant growth is needed.

BRIEF SUMMARY OF THE INVENTION

It is an object of the present invention to reduce leaks in a generally vertical growing system, particularly for soilless mediums. In order to do so, a plant holding unit is provided comprising an opening having an axis and a perimeter rim, the opening aligned along a first plane angled below a second plane approximately normal to an outer surface of the generally vertical member, wherein the axis is approximately perpendicular to the first plane defining a general direction of plant growth; and, a barrier extending generally vertically from and attached to the perimeter rim, wherein the barrier forms a retaining area to prevent water from escaping.

BRIEF DESCRIPTION OF THE SEVERAL VIEWS OF THE DRAWINGS

Other features and advantages of the present invention will become apparent when the following detailed description is read in conjunction with the accompanying drawings, in which.

DETAILED DESCRIPTION OF CERTAIN EMBODIMENTS

As used in this application, the term "a" or "an" means "at least one" or "one or more." The term "about" or "approximately" refers to a range of values within plus or minus 10% of the specified number. The term "substantially" means that the actual value is within about 10% of the actual desired value, particularly within about 5% of the actual desired value and especially within about 1% of the actual desired value of any variable, element or limit set forth herein.

Figure 1:
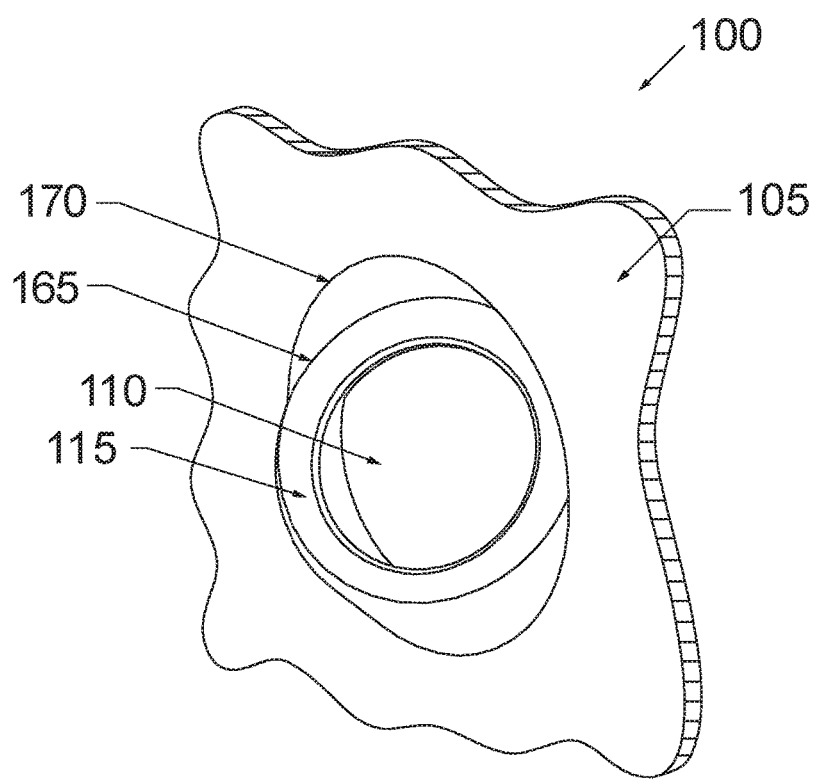
FIG. 1 is a perspective view of a plant holding unit according to an embodiment of the present invention.
Figure 2:
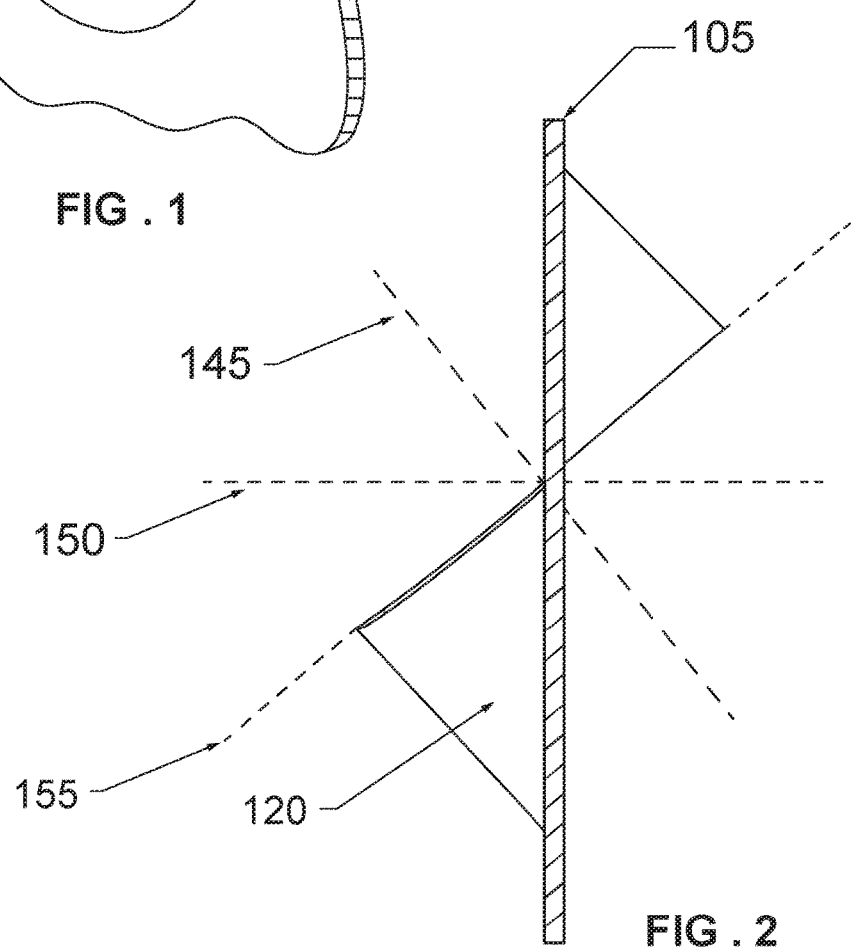
FIG. 2 is a left view of the plant holding unit as shown in FIG. 1.
Figure 3:
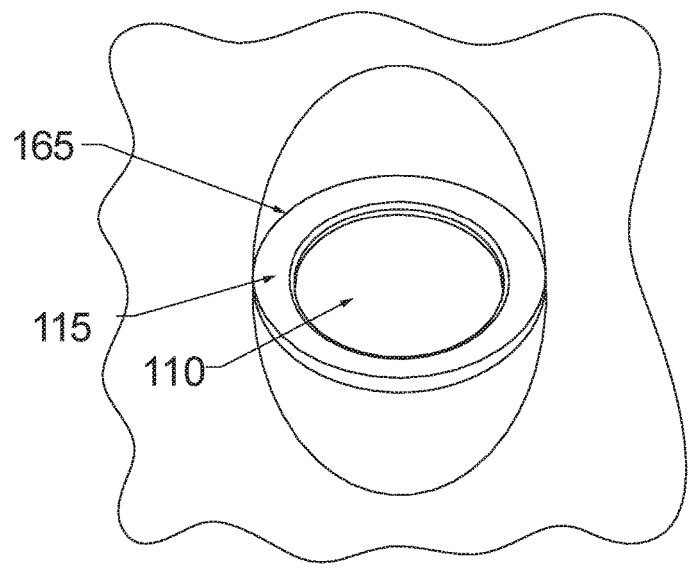
FIG. 3 is a front view of the plant holding unit of FIG. 1.

Referring now to FIGS. 1-3 a plant holding unit 100 is illustrated. In one embodiment, the plant holding unit comprises an opening 110 having an axis 145, a perimeter rim 115, and a perimeter edge 165. The opening is aligned along a first plane 155 that is angled below a second plane 150 approximately normal to an outer surface of the generally vertical member 105. In most situations, the second plane is a horizontal plane parallel to a level ground surface. In some embodiments, the axis of the opening is approximately perpendicular to the first plane, wherein the axis defines the general direction of plant growth. Alternatively, in some embodiments, the axis of the opening is not aligned along the first plane and the therefore the direction of plant growth is not perpendicular to the first plane. In some embodiments, the plant holding unit is positioned within a growing opening 170 of the generally vertical member. This will be described in more detail below.

Figure 4:
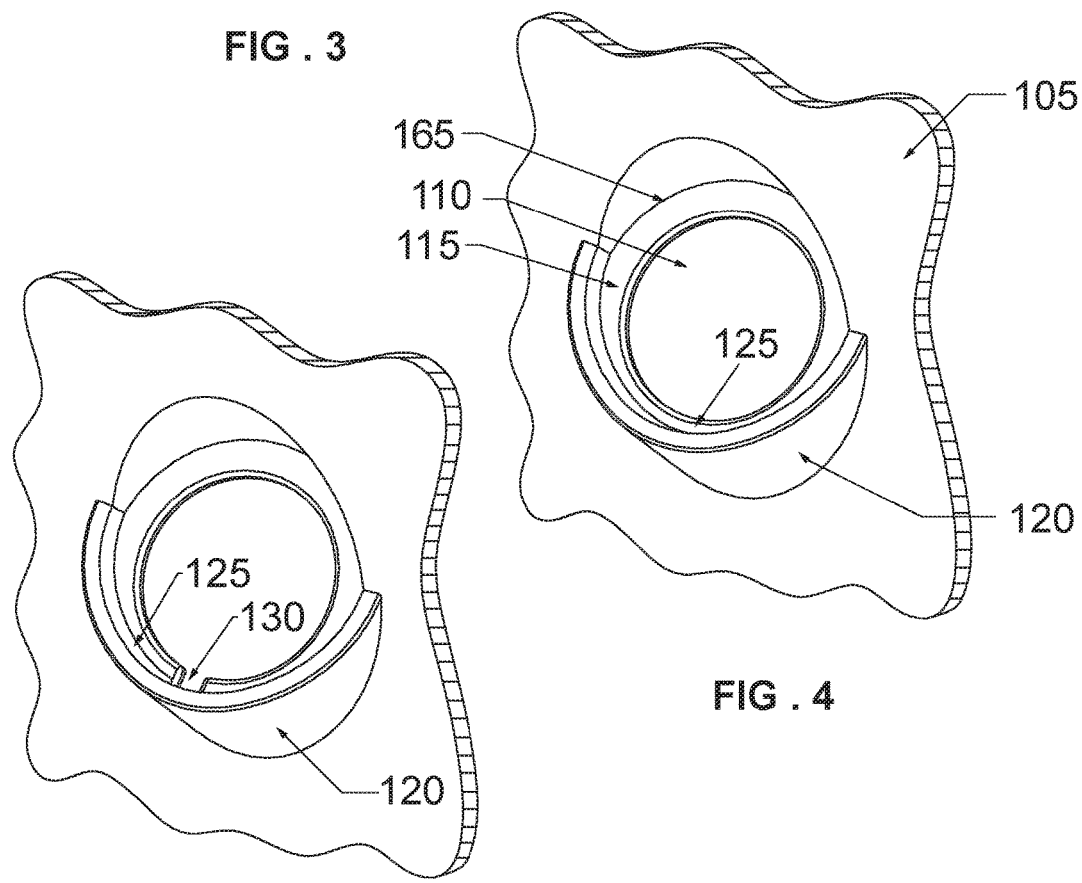
FIG. 4 is a perspective view of a plant holding unit having a barrier according to an embodiment of the present invention.
Figure 5:
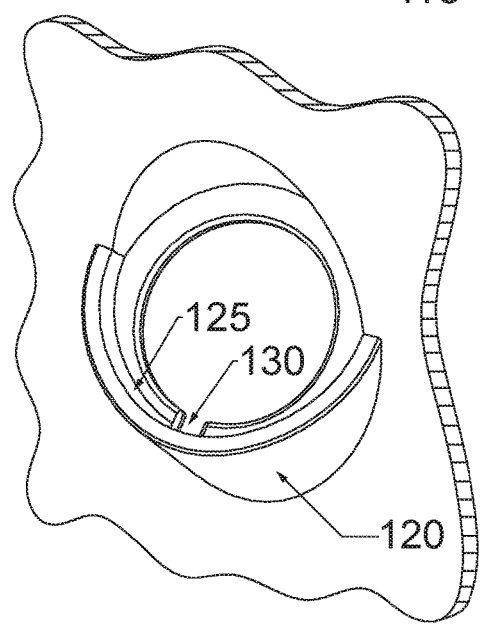
FIG. 5 is a perspective view of a plant holding unit having a barrier with at least one recess according to an embodiment of the present invention.

Referring now to FIGS. 4-5, the plant holding unit includes a barrier 120 extending generally vertically from and attached to the perimeter rim. Advantageously, the barrier forms a retaining area 125 configured to prevent water from escaping from the plant holding unit. This is critical, since when growing plants without soil at an angle in the manner described above, water has a propensity to escape containment from the plant holding unit creating leaks. As expected, leaks lead to unwanted conditions, including but not limiting to water damage and unsightly water marks on the outside of the system. This is particularly important in urban environments wherein any leaked liquids can lead to damage of property or accumulation of biomass such as mold, mildew, or fungi.

In some embodiments, the plant holding unit includes at least one recess 130. Advantageously, one or more recesses enable the water to move from the retaining area into the opening, wherein the water can be absorbed by the soilless medium (not illustrated) and/or returned to the reservoir (not illustrated). Further, the one or more recesses may prevent water from flowing over the barrier to the outer surface of the generally vertical member and system.

In one embodiment, the plant holding unit is intended to be utilized in at least one of the following growing techniques consisting of: an aeroponic system, a hydroponic system, an ultraponic system, an aquaponic system, or any other technique known to one skilled in the art to grow plants with a soilless medium. In one embodiment, the plant holding unit is constructed of at least one member of a material set, by way of non-limiting example, consisting of: a metal, a composite, a wood, a composite material, a ceramic, a thermoplastic, a plastic, or combination thereof. In one embodiment, the opening of the plant holding unit can be at least one shape of a shape set, by way of non-limiting example, consisting of: a honeycomb shape, a square, a triangle, a rectangle, an octagon, an oval, or circular shape.

Figure 6:
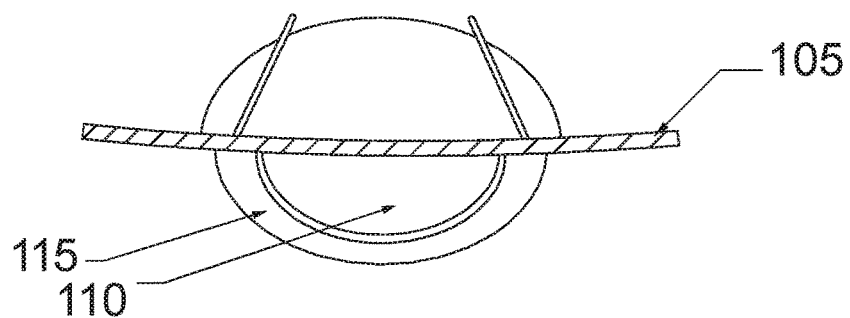
FIG. 6 is a top view of the plant holding unit FIG. 1.
Figure 7:
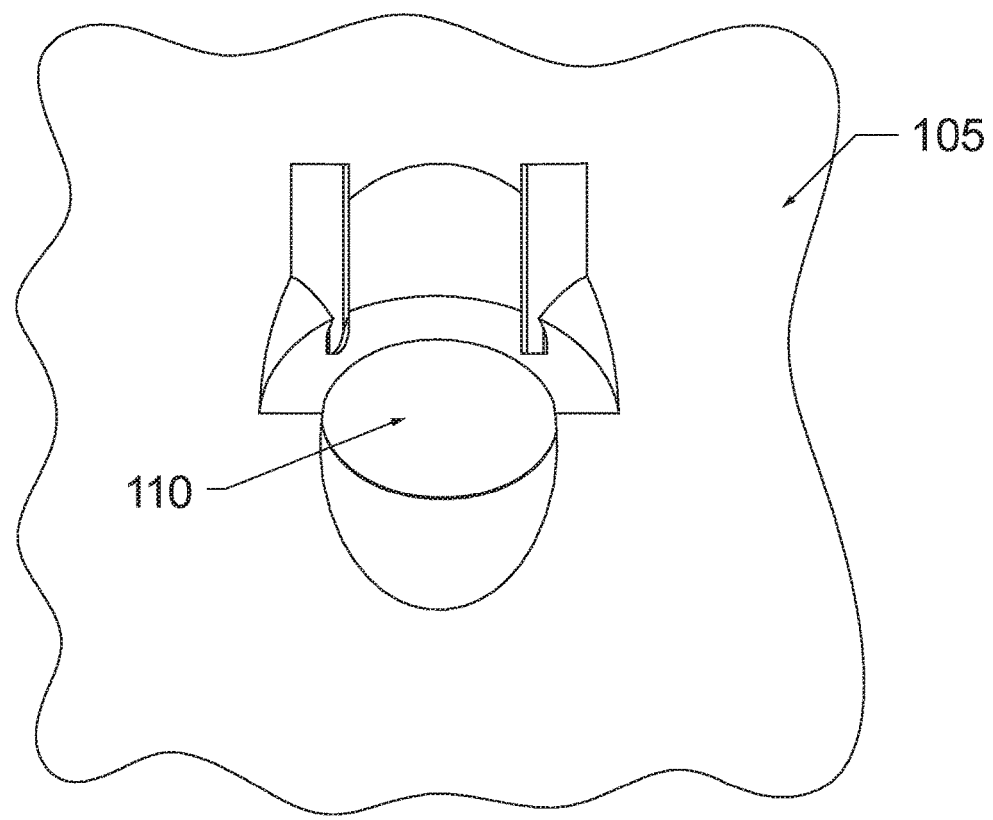
FIG. 7 is a rear of the plant holding unit according to an embodiment of the present invention.

Now referring to FIGS. 6 and 7, the plant holding unit is incorporated within the generally vertical member as illustrated. However, in other embodiments, the plant holding unit can comprise of a modular insert that is completely removable from the generally vertical member and interchangeable. When interchangeable, the plant holding unit can be attached to the generally vertical member by at least one member of an attachment set, by way of non-limiting example, consisting of: a magnet, a clip, a slide-fit, a clamp, a spring, a heat-shrink material flange, a fastener, a spring, an elastic member, an adhesive, or combination thereof. In some embodiments, the barrier alone may be removable allowing the user access to the plant easier, as well as providing improved access during maintenance and cleaning. In some embodiments, the plant holding unit is evenly spaced from the outer surface of the generally vertical member and the inner surface of the generally vertical member. In other embodiments, the plant holding unit may be spaced completely outside the outer surface of the generally vertical member. In other embodiments, the plant holding unit may be spaced completely within the inner surface of the generally vertical member. Furthermore, the plant holding unit in some embodiments can be spaced at any relative position, such as any position from completely within the inner surface of the generally vertical member to completely outside the outer surface of the generally vertical member.

Figure 8:
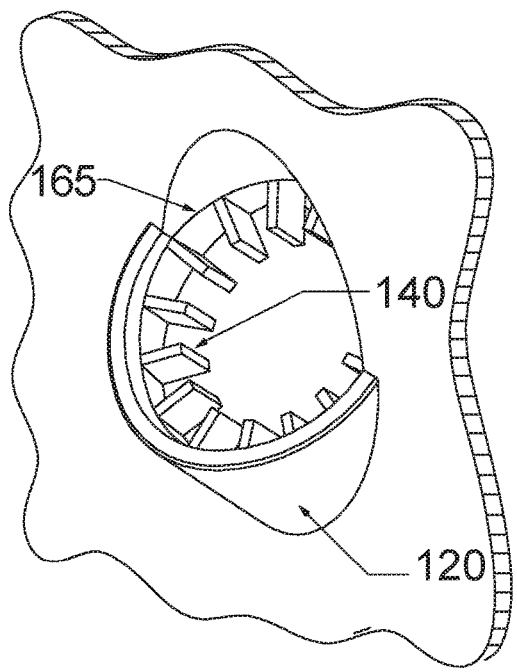
FIG. 8 is a perspective view of a first alternative plant holding unit according to an embodiment of the present invention.
Figure 9:
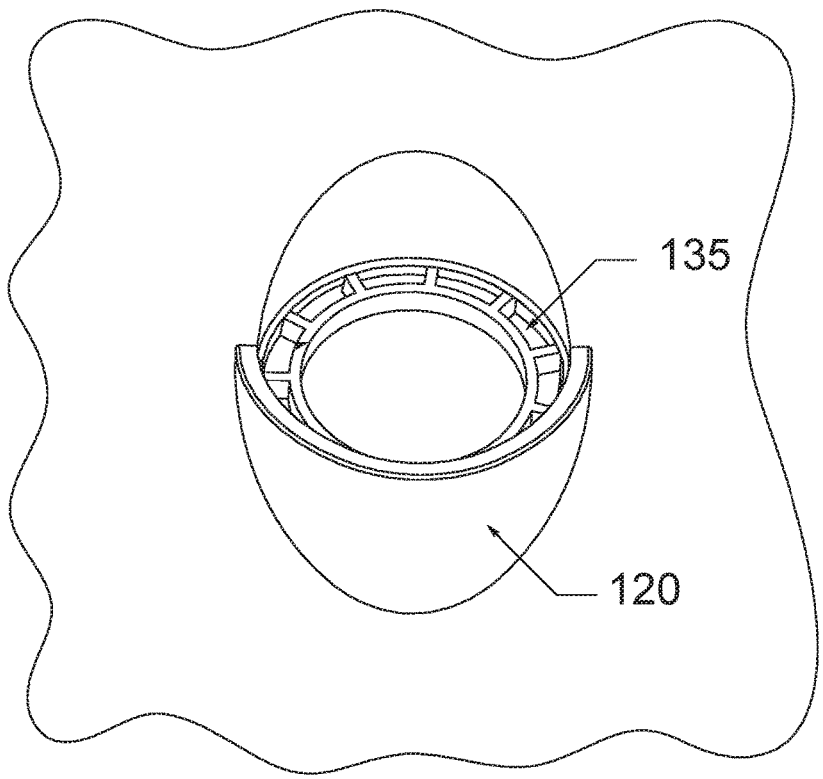
FIG. 9 is a front view of a second alternative plant holding unit according to an embodiment of the present invention.

As previously mentioned, in some embodiments, the perimeter rim may not be provided. In these situations, other designs may be utilized. For instance, referring to FIG. 8, the plant holding unit includes a series of ribs 140 configured to retain the plant or plant container within the plant holding unit. Since, no perimeter rim is present in combination with the series of ribs, excess water retained by the barrier is returned inside the generally vertical member. In another example, shown in FIG. 9, the plant holding unit includes a secondary concentric opening 135 that is supported and attached inside the opening, wherein the secondary concentric opening is configured to retain the plant or the plant container. This design provides a similar solution as the previously described design. It should be understood, that other rimless designs are possible without departing from the spirit and scope of the invention.

Figure 10:
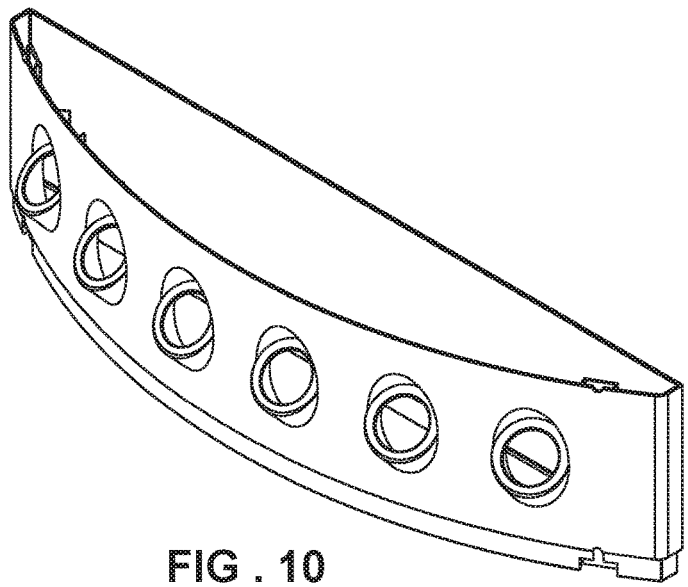
FIG. 10 is a perspective view of one or more plant holding units in a horizontal array according to an embodiment of the present invention.
Figure 11:
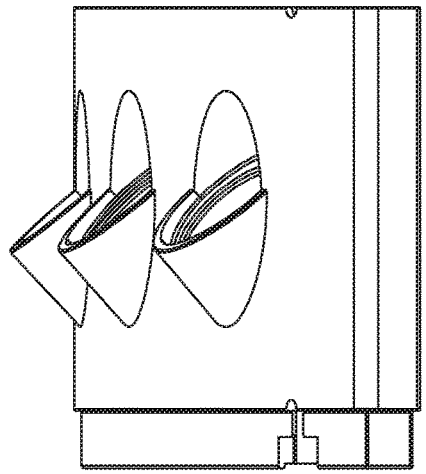
FIG. 11 is a left view of one or more plant holding units in a horizontal array according to an embodiment of the present invention.
Figure 12:
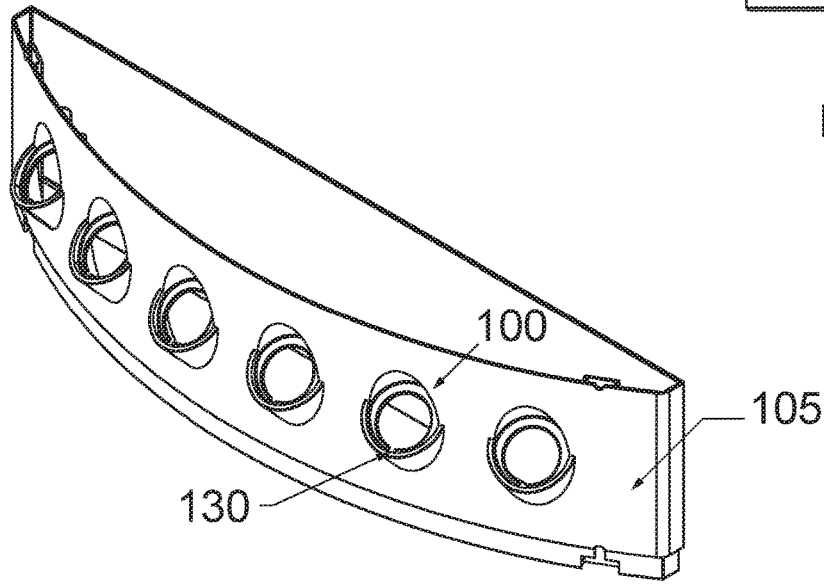
FIG. 12 is a perspective view of one or more plant holding units in a horizontal array according to an embodiment of the present invention

Now referring to FIGS. 10-12, in some embodiments, the plant holding unit may be arrayed in a larger growing system. For instance, one or more plant holding units may be provided in a horizontal array as illustrated. In some embodiments, the horizontal arrays may be stacked vertical. The one or more plant holding units may include any previous designs mentioned, including but not limited to, a perimeter rim with at least one recess and rimless designs.

In any embodiment disclosed, the plant holding unit may include a means of identification. The means of identification may be selected from an identification set consisting of: an alphanumeric identification, a human user's name, a symbolic shape, a company brand, a numeric identification number, a QR code, a barcode, and an RFID tag. The means of identification is used for, by way of non-limiting example, for identifying what species of plant is being grown within the plant holding unit, the size of the plant holding unit, or the date in which the plant was placed within the plant holding unit.

Figure 13:
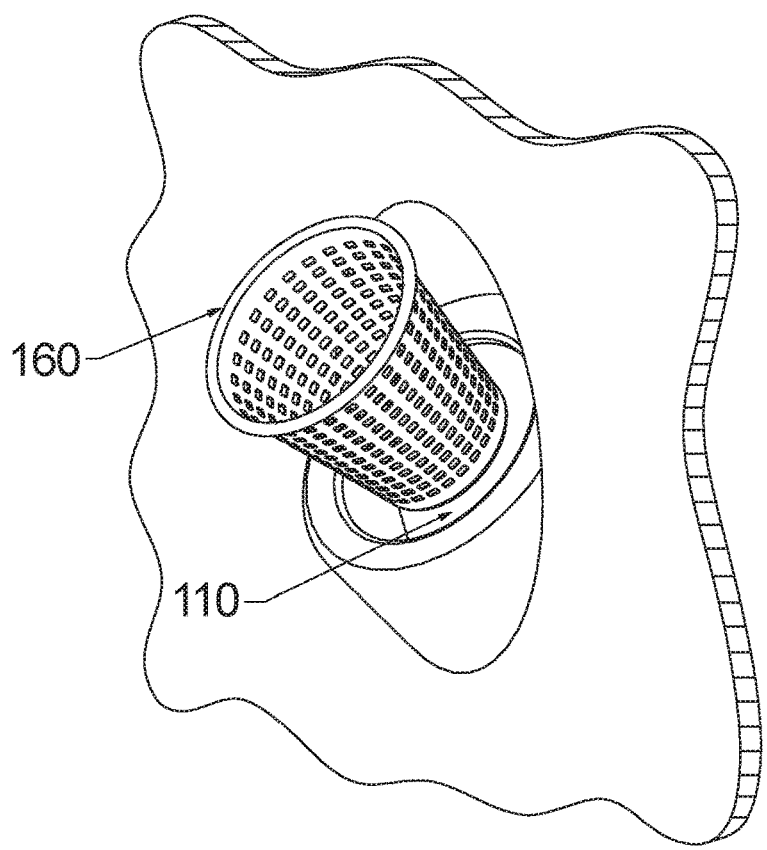
FIG. 13 is a perspective view of a plant container within the opening of a plant holding unit according to an embodiment of the present invention.
Figure 14:
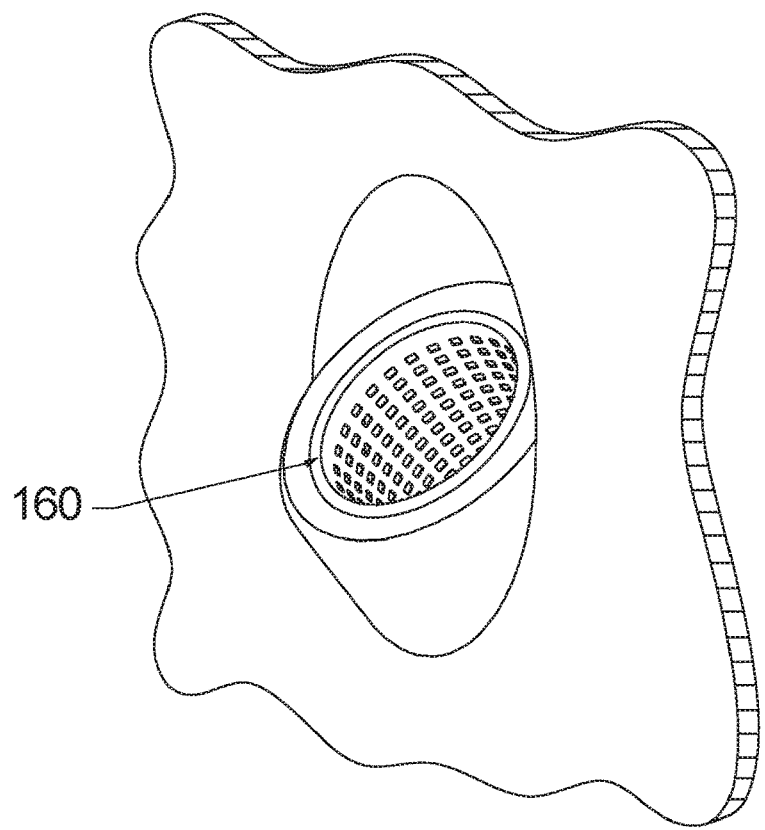
FIG. 14 is a perspective view of a plant container in the opening of a plant holding unit according to an embodiment of the present invention.

Referring now to FIGS. 13-14, a plant container 160 is shown resting within the plant holding unit. Although a circular net container is illustrated, it is understood that any type and/or shape container may be used. For instance, if opening 110 is of a circular shape, the plant container is most likely to be a cylindrical shape or a frustoconical shape, i.e. the shape of the plant container selected will most likely match the shape of the opening, as the shape of the opening may vary. For instance, as previously mentioned, in some embodiments the opening may be rectangular, oval, triangular, or an irregular shape. In some embodiments, the plant container is made of a container material set, by way of non-limiting example, consisting of: a metal screen material, a metal mesh material, a metal screen material, a foam material, a wood material, a rubber material, a plastic mesh material, a wood material, a perforated plastic material, a fabric material, a wool material, a urethane plastic material or any combination thereof. In some embodiments, the plant holding unit is further textured to assist in removing components of the plant holding unit, directing liquid flow, or moving the plant holding unit. The plant holding unit can be textured on any surface with at least one member of a texture set consisting of: indentations, sandpaper, extrusions, knurling, a rough surface, bumps, or any combination thereof.

Although the invention has been described in considerable detail in language specific to structural features and or method acts, it is to be understood that the invention defined in the appended claims is not necessarily limited to the specific features or acts described. Rather, the specific features and acts are disclosed as exemplary preferred forms of implementing the claimed invention. Stated otherwise, it is to be understood that the phraseology and terminology employed herein, as well as the abstract, are for the purpose of description and should not be regarded as limiting. Therefore, while exemplary illustrative embodiments of the invention have been described, numerous variations and alternative embodiments will occur to those skilled in the art. Such variations and alternate embodiments are contemplated, and can be made without departing from the spirit and scope of the invention. For instance, in one embodiment, the plant holding unit has no barrier and liquids are allows to flow over the perimeter edge and below the plant holding unit. For example, another plant holding unit can be positioned directly below or in relation to another plant holding unit, wherein liquid allowed to flow over the perimeter edge to the outer surface or the inner surface of the generally vertical member is recaptured by another plant.

It should further be noted that throughout the entire disclosure, the labels such as left, right, front, back, top, bottom, forward, reverse, clockwise, counter clockwise, up, down, or other similar terms such as upper, lower, aft, fore, vertical, horizontal, oblique, proximal, distal, parallel, perpendicular, transverse, longitudinal, etc. have been used for convenience purposes only and are not intended to imply any particular fixed direction or orientation. Instead, they are used to reflect relative locations and/or directions/orientations between various portions of an object.

In addition, reference to "first," "second," "third," and etc. members throughout the disclosure (and in particular, claims) are not used to show a serial or numerical limitation but instead are used to distinguish or identify the various members of the group.

What is claimed is:

1. A plant holding unit for supporting at least one plant on a generally vertical member, the plant holding unit comprising:
   an opening having an axis and a perimeter rim, the opening aligned along a first plane angled below a second plane approximately normal to an outer surface of the generally vertical member, wherein the axis is approximately perpendicular to the first plane defining an approximate direction of plant growth; and,
   a barrier extending generally vertically upward and perpendicular from and attached to the perimeter rim, wherein the barrier extends and surrounds a lower portion of the perimeter rim forming a retaining area to prevent water from escaping.

2. The plant holding unit of claim 1, wherein the perimeter rim includes a recess enabling the water to move from the retaining area into the opening.

3. A plant holding unit for supporting a plant on a generally vertical member, the plant holding unit comprising:
   an opening having an axis and a perimeter edge, the opening aligned along a first plane angled below a second plane approximately normal to an outer surface of the generally vertical member, wherein the axis is approximately perpendicular to the first plane defining an approximate direction of plant growth; and,
   a barrier extending generally vertically upward from and attached to the perimeter edge, wherein the barrier extends and surrounds a lower portion of the perimeter edge forming a retaining area to prevent water from escaping.

4. The plant holding unit of claim 3, further comprising a series of ribs configured to retain a plant container.

5. The plant holding unit of claim 3, further comprising a secondary concentric opening supported and attached inside the opening, wherein the secondary concentric opening is configured to retain a plant container.

6. A system comprising:
   a generally vertical member having at least one growing opening, the at least one opening having a horizontal plane approximately perpendicular to the at least one opening;
   at least one plant holding unit within the at least one growing opening, the at least one plant holding unit including an opening having an axis and a perimeter edge, the opening aligned approximately along a first plane angled below the horizontal plane, wherein the axis is approximately perpendicular to the first plane defining a general direction of plant growth; and,
   a barrier extending generally vertically upward and attached to the perimeter edge, wherein the barrier extends and surrounds a lower portion of the perimeter edge forming a retaining area to prevent water from escaping.

7. The plant holding unit of claim 6, further comprising a perimeter rim.

8. The plant holding unit of claim 7, wherein the perimeter rim includes a recess enabling the water to move from the retaining area into the opening.

* * * * *